March 1, 1932.
A. L. GENTER
1,847,179
RECOVERY OF METALLIC WASTES FROM GAS WASHERS FOR METALLURGICAL FURNACES
Filed June 6, 1930          2 Sheets-Sheet 1
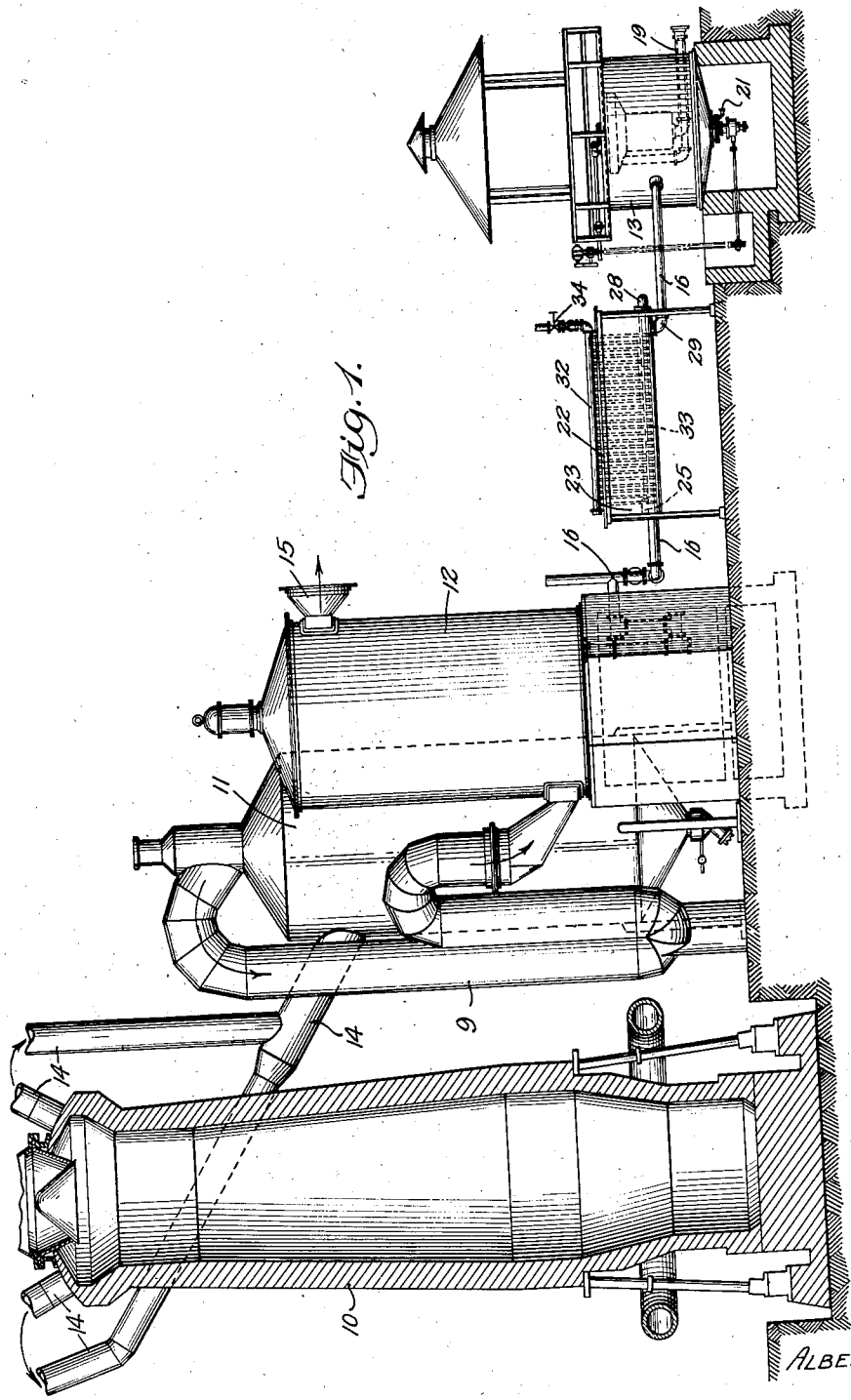
Inventor
ALBERT L. GENTER.
By Henry Love Clarke
Attorney March 1, 1932. A. L. GENTER 1,847,179
RECOVERY OF METALLIC WASTES FROM GAS WASHERS FOR METALLURGICAL FURNACES
Filed June 6, 1930 2 Sheets-Sheet 2
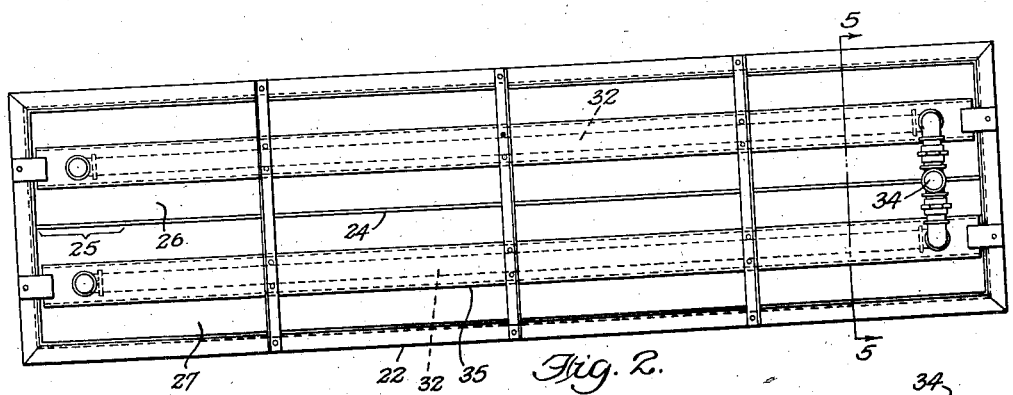
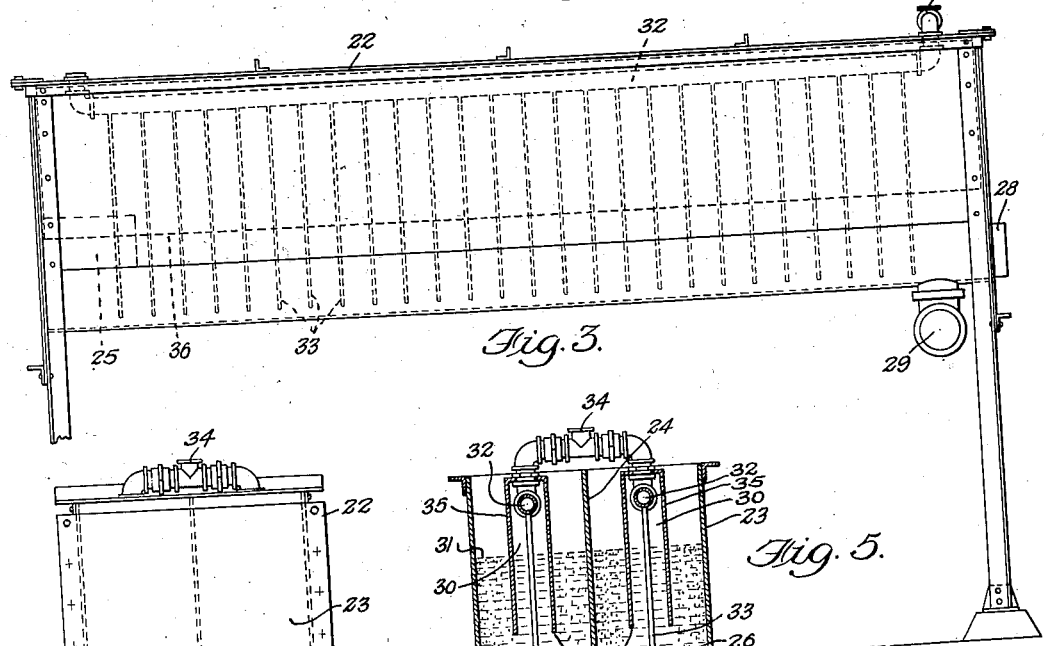
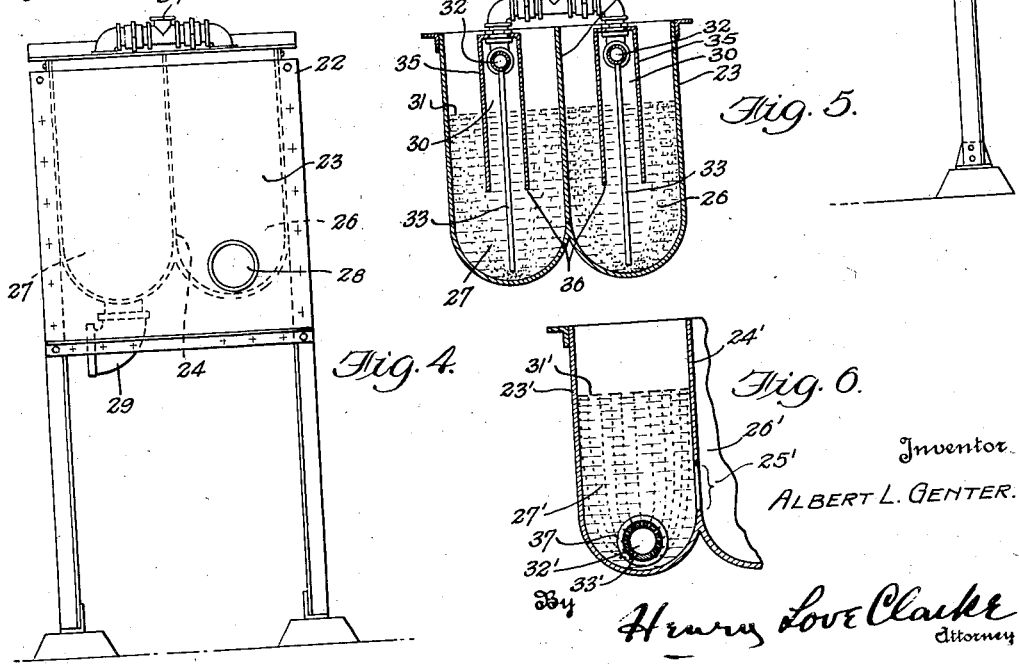
Inventor
ALBERT L. GENTER.
By Henry Love Clarke
Attorney Patented Mar. 1, 1932

1,847,179

UNITED STATES PATENT OFFICE

ALBERT L. GENTER, OF BALTIMORE, MARYLAND, ASSIGNOR TO THE BARTLETT HAYWARD COMPANY, OF BALTIMORE, MARYLAND, A CORPORATION OF MARYLAND

RECOVERY OF METALLIC WASTES FROM GAS-WASHERS FOR METALLURGICAL FURNACES

Application filed June 6, 1930. Serial No. 459,503.

This invention relates in general to improvement in recovery of metallurgical products from spent washing liquids of metallurgical-furnace gas-washers, and more particularly to improvements in recovery of iron from the spent wash waters of blast-furnace gas-washers.

As is well known, the dust of blast furnace gas contains fine iron ore, coke and lime dust which have been carried by entrainment along with the gases from the furnace. It has been common practice to remove the dust from such furnace gases by scrubbing or washing the gases with water to clean the gas for subsequent combustion purposes, and to recover the ore from the spent gas washing liquids by filtering, settling, thickening or other means for separating the dust suspended in the spent furnace gas washing liquids. This gas washing is usually accomplished by passing the gases from the blast furnace upwardly through a suitable tower in contact with a descending flow of water. Thus practically all of the fine ore dust, and the coke and lime dust carried in the unwashed gas is precipitated by the water and carried along therewith out of the scrubbing apparatus as a sludge. The towers are usually so constructed as to cause the streams of gas and water to follow tortuous paths. According to some present practices the water is permitted to flow through the tower in film or spray curtains in contact with baffles or packing material contained therein, the necessary intimate contact of the gases with the water being achieved through the turbulency of the gases in their upward passages and the turbulency of the water in its downward tortuous flow. In some instances the towers are so constructed that the water in its downward course is caused to flow in sheets across the path of travel of the gases. In other instances, the towers, or their horizontal equivalents, are provided with mechanical devices which cause a spraying, beating or atomization of the water particles in the paths of travel of the gases.

From these scrubbing towers or apparatus the spent liquid sludge is led to the separating means for recovering the suspended iron and other compounds by filtering, decantation, settling or otherwise dewatering them from the sludge. Practice shows that the water from such solid and liquid separating means, after being freed of its suspended solids, by such separating means becomes rusty and turbid even though it has been efficiently filtered or otherwise treated to substantially clear it of suspended solids. This condition is attributed to the probable fact that the spent sludge from the blast-furnace gas-scrubbers contains considerable amounts of dissolved iron as well as insoluble iron compounds. In fact such filtered water from such gas scrubbing operations does, when exposed for a time to the atmosphere, become rusty and turbid, which is probably due to the gradual oxidation of dissolved ferrous bicarbonate in the filtered liquor with liberation of insoluble ferric hydroxide therein.

As most of the iron ore dust in the gas results from iron ore, such as ferric oxides, which have been introduced into the blast furnace for reduction purposes and which have been blown out of the furnace with and entrained by the gas from such furnaces, it is evident that such dust in the blast furnace gases will be partially depleted in oxygen, due to the reducing reactions in the furnace, and will or may be in the ferrous oxide condition.

It is well known that ferrous oxides are readily soluble in the presence of carbon dioxide gas, thus forming soluble ferrous bicarbonate.

Typical blast furnace gases contain approximately the following volumetric percentages of various gases:—

| | Per cent |
|---|---|
| Carbon monoxide | 23 |
| Carbon dioxide | 12 |
| Methane | 2 |
| Hydrogen | 2 |
| Water vapor | 3 |
| Nitrogen | 58 |

As such typical blast furnace gases enter the gas scrubber at temperatures ranging from 250° to 600° F., and due to the manner of contact of the gas with the liquid required to remove the dust from the gas, it is evident that the carbon dioxide present in the gas has ample time in which to react with the cooling and scrubbing water in the gas scrubber and ferrous oxide in the gas to form soluble ferrous bicarbonate in the scrubbing water. The chemical reaction may be exemplified as follows:

$$FeO + 2CO_2 + H_2O = Fe(HCO_3)_2$$

Ferrous-bicarbonate in the presence of water and oxygen forms both ferric hydrate [Fe(OH)$_3$] and hydrated ferric oxide [Fe$_2$O$_3$2Fe(OH)$_3$] as a water insoluble precipitate, so that both reactions will occur, either individually or simultaneously, in bubbling air through a solution of ferrous-bicarbonate in order to supply a surplus of oxygen. Consequently, iron so dissolved in the gas scrubbing water can be removed from solution either by precipitation with chemicals for such purpose, such as caustic soda or lime, or by oxidation of the soluble ferrous-bicarbonate to insoluble ferric hydroxide, as exemplified by the following equations:

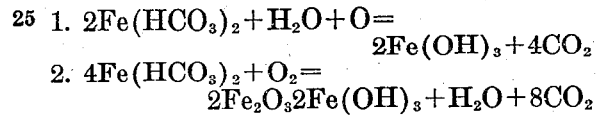

1. $2Fe(HCO_3)_2 + H_2O + O = 2Fe(OH)_3 + 4CO_2$
2. $4Fe(HCO_3)_2 + O_2 = 2Fe_2O_3 2Fe(OH)_3 + H_2O + 8CO_2$

Wherefore, it is believed that the rusty and turbid condition of the sludge after filtering is due to the dissolving of iron in the scrubber by the gas washing liquids, which dissolved iron, being in solution, is not arrested by but readily passes through the filter or other solid and liquid separating means, and is subsequently oxidized slowly by the oxygen of the air to the ferric state, thereby producing the rusty and turbid condition of the filtered waste water from the gas scrubber.

Objects of the present invention are to recover such dissolved iron compounds as well as the insoluble iron compounds and thereby effect a more complete recovery of the iron compounds from blast furnace gases and the spent gas-washing liquors therefor; to produce a clear effluent from the filtering or other solid and liquid separating operations, for recovering the solids from such spent gas washing liquors; to accelerate and thereby hasten the oxidation action and precipitation of the dissolved iron compounds; to effect such oxidation and precipitation in the spent liquor before it passes through the filter, or other solid and liquid separating medium, for effecting the recovery of the insoluble iron compounds and thereby effect separation of the dissolved iron compounds at the same time and by the same separating means heretofore employed for recovering the insoluble iron compounds; to effect such oxidation and precipitation by the relatively simple expedient of aeration with well known liquid aeration means; and the invention has for further objects such other advantages in operation or result as may be found to obtain in the method or apparatus hereinafter set forth or claimed.

In accordance with the present invention the spent sludges from the gas washers for washing gases from metallurgical furnaces, such as blast furnaces, are subjected to treatment to render insoluble in such liquors the soluble metal compounds and especially dissolved iron compounds in the spent sludge of blast-furnace gas-washers, so as thereby to precipitate them from solution to suspension in the said liquors. Advantageously, the spent sludges from the blast furnace gas-washers are so treated by effecting an aeration of the sludge to cause an oxidation therein of the dissolved iron compounds, such as ferrous bicarbonates, to insoluble iron compounds, such as ferric hydrate, and the aerated sludge thereafter subjected to a known solid and liquid separating operation to separate from the liquid of the sludge the iron compounds that were converted from soluble to insoluble compounds by such aeration. Preferably such aeration of the spent sludge from the gas washing operations hereinbefore described is effected before the spent sludge passes through the filtering medium, or other solid and liquid separating medium, heretofore employed in usual practice after the gas washer, to recover the iron from the spent gas washing sludge.

This aeration oxidation action not only puts such iron into the insoluble condition along with the other solids that were already in suspension and saves such dissolved iron along with such previously suspended solids in any subsequent dewatering operation used for the purpose of iron recovery from such scrubber effluents, but also renders the final water from such dewatering system freer from pollution properties, especially in industrial localities. Further, where water from such blast-furnace gas-scrubbers is to be finally purified for boiler feed purposes, or is to be further treated by water softening chemicals, the preliminary aeration treatment of the present invention will effect a considerable saving in chemicals that would otherwise be employed for elimination of the dissolved iron compounds.

Still further, the preliminary aeration of the sludges from such gas washers has an advantageous effect on the usual filters through which the water is separated from the solids of such sludge. It has been found in practice that the filtration of such scrubber sludges containing dissolved iron compounds results in clogging of the pores of the various filtering media employed, due to the accidental and fortuitous breaking down of the iron compounds within the pores of the medium as the clear filtrate passes therethrough. This deposit of iron hydrate or oxide in the medium itself soon renders the medium impervious. With the aeration of the present invention preliminarily to the filtration, the breaking down and precipitation of the dissolved iron compounds is effected before the liquid reaches the filter medium. Consequently, such hardening effect of the filtering medium is greatly lessened by the present invention, and the efficiency and life of the filter medium increased.

Ordinarily, the novel aeration of the spent sludges may be effected in accordance with the present invention by the simple expedient of running the spent sludge, after it leaves the gas scrubber and before it reaches the filter, or other solid and liquid separating means for the sludge, through an open trough of any desired length into which air is introduced so as to bubble up through a current of spent sludge flowing through the aeration trough. It is apparent, however, that any other well known aeration means for liquid may be employed in place of the aeration trough mentioned, or other means adapted to effect a precipitation from solution to suspension of dissolved metal compounds acting similarly to ferrous bicarbonate in solution for purposes of the result obtained with the present invention.

In the accompanying drawings, forming a part of this specification and showing, for purposes of exemplification, a preferred form and manner in which the invention may be embodied and practiced, but without limiting the claimed invention specifically to such illustrative instance or instances;

Figure 1 is a typical layout of a plant arranged to practice and embody the method and apparatus of the present form;

Fig. 2 is a top plan view of one form of an aeration tank adapted to be employed in conjunction with the present invention;

Fig. 3 is a side elevational view of the same;

Fig. 4 is an end elevational view of the same;

Fig. 5 is a vertical cross-sectional view of the same taken on the lines 5—5 of Fig. 2; and Fig. 6 is a vertical cross-sectional view of another form of aeration tank adapted to be employed in connection with the present invention.

In its present embodiment, the invention is incorporated in a blast furnace plant for reducing iron ore and, for convenience, the present description will be confined to this use of the invention; features of the method and apparatus therefor are, however, capable of other valuable applications and consequently the invention is not confined to the specific use and specific embodiment herein described as an illustrative example.

Referring to the drawings, there are illustrated views of a blast furnace plant of the type hereinbefore mentioned which embodies a blast furnace 10, a cyclone dust arrester 11, a gas washer 12 and a thickener 13. The furnace, washer and thickener are of usual and well known construction and therefore need not be described in more detail here. As shown, the various apparatus of the plant are provided with the usual connections whereby, as heretofore employed, the gases from the blast furnace 10 pass through conduit 14 to the dust arrester 11 and then through connections 9 to the gas washer 12 to be washed therein with liquid supplied thereto in the usual manner. From the washer 12 the cleaned gas passes through the outlet 15 to further apparatus for cleaning, storage or use. The spent wash water or sludge from the scrubber 12 containing iron dissolved in the wash water while in the washer 12, as well as the usual insoluble solids, passes through the conduit line 16 leading to the thickener 13 as heretofore. In the thickener, which is of the type exemplified in Patent No. 1,716,040, the sludge is thickened to separate the insoluble solids from the liquids and the liquid discharged at 19 while the recovered solids are removed at 21 for return to the blast furnace 10. In accordance with the present invention, there is provided in the conduit line 16 leading from the scrubber 12 to the thickener 13, an aeration means 22 adapted for aerating the sludge in advance of its being thickened by the thickener. In its present form the aeration means 22 comprises a trough 23 having a dividing wall 24 which extends from one end of the trough to the other end thereof and provided with an opening therein so as to form an outlet 25 for flow of sludge from one compartment 26 to another compartment 27 in the trough 23. The sludge flowing through the line 16 from the gas washer 12 to the thickener 13 enters the compartment 26 of the aerator at 28, passes through the opening 25 into the compartment 27, and leaves the aerator compartment 27 at 29.

The aerator 22 is so disposed that the sludge is maintained therein up to the top level 31. In the present instance, the double trough is employed for purposes of advantageously conserving lengthwise space required by the fact that length must be provided to give the liquid time for completion of the aeration action on the sludge while maintaining a continuous flow. It is, however, apparent that a trough in a single line will serve equally well for the same essential purpose of the present invention.

Mounted above the top level 31 for the flowing sludge is an aerator pipe or manifold 32 having a requisite number of smaller vertical feed branches 33 extending downwardly into the compartments 26, 27, so as to have their lower open ends dipping in the sludge below the top level 31 and near the bottom of the compartments of the aeration chamber means.

Surrounding the manifold 32 and enclosing the upper portions of the vertical feed branches 33 is an inverted trough 35 forming an aeration chamber 30, and having its lower edges 36 dipping approximately two or three inches below the top level 31 for the flowing sludge stream. The portions of the manifold 32 in the respective compartments 26, 27, are supplied with low pressure air through the common air supply means 34. Air so supplied passes into the liquid sludge through the open lower ends of the vertical feed passages 33. The escaping air bubbles lift and agitate the liquid in the compartments 26, 27 and then burst in the chamber 30 under the trough 35. As further air bubbles burst in said chamber, the excess air escapes under the edges 36 to the outer sides of the trough 35 and thus effect a further aeration of the sludge in passing around the edges 36 and through the liquid.

In the form of the aeration means shown in Fig. 6 the air manifold 32 and vertical feed branches 33 are eliminated, and in place thereof there is submerged below the level 31 a horizontal conduit or pipe 32' provided with openings 33' and wrapped with rubber covering 37 having perforations, foraminations, or pores therein. The air, in this embodiment of the invention, is distributed from the interior of the pipe 32' through the openings 33' and then diffused as minute bubbles, or as finely atomized air, into the flowing sludge by the pore-like openings of the rubber covering.

The spent gas washing sludge from the blast-furnace gas-washer in passing through the aeration means becomes aerated and as a result thereof any oxidizable soluble iron compounds that may be present in the sludge are oxidized to the insoluble state. The newly formed iron compounds are thereby caused to fall out of solution, and remain as solids in suspension in the flowing sludge until separated from the liquid content of the sludge by the solid and liquid separating means 13 as usually employed heretofore to separate the solids, or insoluble content, from the liquid of effluent from the gas washer. As the aeration is effected in advance of the separating means 13, it will be apparent that the oxidized soluble iron compounds will be in the same solid state as the solid matter that has heretofore been separated from the liquid by such separating means, and therefore the separation and recovery of the soluble iron compounds will be effected by the same apparatus and process steps heretofore employed for the insoluble compounds and through which the soluble iron compounds heretofore have passed on as filter effluent.

It will be apparent from the foregoing description that the novel features of the present invention are well adapted to advantageous employment with other types of gas washer and with other types of dewatering or solid and liquid separating means and methods, and that the invention may be advantageously employed in conjunction with blast or other furnaces for treatment by reduction of ores other than iron ores.

It will also be manifest from the foregoing description that the oxidizing properties of the air used may be materially augmented by the introduction into the air used of some ozone, from well known ozonators; and that liquid oxidizing agents also may be advantageously added to the sludge and/or air current as an aid to the main aerating action for accomplishing the novel oxidation of the present invention.

The invention as hereinabove set forth or exemplified may be variously practiced or embodied within the scope of the claims hereinafter made.

I claim:

1. In the recovery of iron from blast furnace gas, the method comprising washing blast furnace gas with liquid to remove dust from said gas; aerating the spent gas-washing liquid to oxidize and precipitate soluble iron compounds dissolved therein; and separating and recovering the insoluble content from the liquid of the so aerated spent gas-washing liquid.

2. In the recovery of iron from blast furnace gas, the method comprising washing blast furnace gas with liquid to remove dust from said gas; treating the spent gas-washing liquid to oxidize and precipitate soluble iron compounds dissolved therein; and separating and recovering the insoluble content from the liquid of the so treated spent gas-washing liquid.

3. In a method of recovering iron from liquid effluent of blast-furnace gas-scrubbers which involves separating and recovering insoluble solids from the liquid of said liquid effluent, the improvement comprising: aerating said effluent to oxidize and precipitate soluble iron compounds dissolved therein in advance of said separating and recovering of insoluble solids therefrom.

4. In a method of recovering iron from liquid effluent of blast-furnace gas-scrubbers which involves separating and recovering insoluble solids from the liquid of said liquid effluent, the improvement comprising: treating said effluent to oxidize and precipitate soluble iron compounds dissolved therein in advance of said separating and recovering of insoluble solids therefrom.

5. In the treatment of liquid effluent from blast-furnace gas-scrubbers, the improvement comprising: introducing air into the said effluent to oxidize and precipitate therein iron compounds dissolved in said effluent, and recovering the so oxidized and precipitated iron compounds.

6. In apparatus of the character described, the combination with a blast-furnace gas-washer adapted for washing gas from a blast furnace with a washing liquid, and solid and liquid separating means adapted for separating solids from liquid of spent wash liquid from said gas-washer, of an aeration means adapted for aeration of said spent wash liquid, and means for conducting spent liquid from said gas-washer, to said aeration means, and means for conducting the aerated liquid from said aeration means to said solid and liquid separating means.

7. In apparatus for recovering iron from blast furnace gas comprising a gas-washer for washing said blast furnace gas with gas washing liquid, and solid and liquid separating means adapted for effecting separation and recovery of solids including iron from spent washing liquid from said gas-washer and means for passing said liquid from said gas-washer to said solid and liquid separating means, the improvement comprising means adapted for aerating the spent washing liquid that may pass from said washer to said separating means.

In testimony whereof I have hereunto set my hand.

ALBERT L. GENTER.